United States Patent Office 2,966,507
Patented Dec. 27, 1960

2,966,507

1,3-BIS(PENTAALKYLDISILOXANYL-ALKYLENE) UREAS

Stewart R. Montgomery, El Dorado, Ark., assignor to Monsanto Chemical Company, St. Louis, Mo., a corporation of Delaware No Drawing. Filed Dec. 20, 1957, Ser. No. 704,012

9 Claims. (Cl. 260—448.2)

This invention relates to silicon-containing ureas and to the method for their preparation.

It is an object of this invention to provide a new class of silicon-containing ureas having utility as antifoam agents. Other objects will become apparent from the description of the invention.

The novel ureas of this invention are 1,3-bis(pentaalkyldisiloxanylalkyl)ureas represented by the following formula:

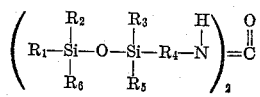

Formula I wherein $R_1$, $R_2$, $R_3$, $R_5$ and $R_6$ represent alkyl radicals and $R_4$ represents an alkylene radical, and preferably wherein said alkyl and alkylene radicals contain from 1 to 18 carbon atoms. The ureas of this invention are prepared by reacting, preferably at an elevated temperature, carbonyl sulfide and mono-primary pentaalkyldisiloxanylalkyl amines having the following formula:

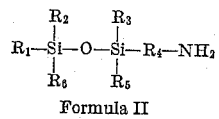

Formula II wherein $R_1$, $R_2$, $R_3$, $R_5$ and $R_6$ represent alkyl radicals and $R_4$ represents an alkylene radical, and preferably wherein said alkyl and alkylene radicals contain from 1 to 18 carbon atoms. The following examples are illustrative of this invention.

*Example I*

A mixture of 0.2 mol of pentamethyldisiloxanylmethylamine and 20 ml. of dry toluene and a Teflon-covered stirring bar were placed in a one-liter, stainless-steel pressure reaction vessel. The reactor was charged to 100 p.s.i.g. with carbonyl sulfide (0.24 mol) at 25° C. The mixture was stirred and heated at 100° C. under a pressure of 130 p.s.i.g. for four hours. After cooling the vessel and venting the gases present, the residual liquid was partially evaporated on a steam bath. On cooling, crystals of 1,3-bis(pentamethyldisiloxanylmethyl)urea separated and were recovered. Two recrystallizations of this material from acetonitrile resulted in a 69% yield of 1,3-bis(pentamethyldisiloxanylmethyl)urea having a melting point of 60°–72° C. and the following analysis:

| | C, percent | H, percent | N, percent | Si, percent |
|---|---|---|---|---|
| Calculated for $C_{13}H_{36}N_2O_3Si_2$ | 41.02 | 9.53 | 7.36 | 29.48 |
| Found | 40.92 | 9.29 | 7.62 | 29.47 |

*Example II*

The procedure set fort in Example I is repeated using as the amine β-pentaethyldisiloxanylethylamine. An excellent yield of 1,3-bis(β-pentaethyldisiloxanylethyl)urea is obtained.

*Example III*

The procedure set forth in Example I is repeated using as the amine pentapropyldisiloxanylmethylamine. An excellent yield of 1,3-bis(pentapropyldisiloxanylmethyl)urea is obtained.

*Example IV*

The procedure set forth in Example I is repeated using as the amine β-penta-n-hexyldisiloxanylethylamine. An excellent yield of 1,3-bis(β-penta-n-hexyldisiloxanylethyl)urea is obtained.

*Example V*

The procedure set forth in Example I is repeated using as the amine penta-2-ethylhexyldisiloxanylmethylamine. An excellent yield of 1,3-bis(penta-2-ethylhexyldisiloxanylmethyl)urea is obtained.

Following the procedure set forth in Example I, the following ureas can be prepared using the indicated amine:

| Amines | Ureas |
|---|---|
| pentabutyldisiloxanylmethylamine | 1,3-bis(pentabutyldisiloxanylmethyl)urea. |
| β-(1,1-ethylmethyl-3,3,3-trimethyldisiloxanyl)-ethylamine. | 1,3-bis[β-(1,1-ethylmethyl-3,3,3-trimethyldisiloxanyl)-ethyl]urea. |
| β-[1,1-dimethyl-3,3,3-(2-hydroxyethyl)-dimethyldisiloxanyl]-ethylamine. | 1,3-bis{β-[1,1-dimethyl-3,3,3-hydroxyethyl)-dimethyldisiloxanyl]-ethyl}urea. |
| α-[1,1-dipropyl-3,3,3-(2-chloropropyl)-dimethyldisiloxanyl]-propylamine. | 1,3-bis{α-[1,1-dipropyl-3,3,3-(2-chloropropyl)-dimethyldisiloxanyl]-propyl}urea. |
| α-[1,1-ethyl-(2-nitrobutyl)-3,3,3-tributyldisiloxanyl]butylamine. | 1,3-bis{α-[1,1-ethyl-(2-nitrobutyl)-3,3,3-tributyldisiloxanyl]-butyl}urea. |
| α-pentaoctadecyldisiloxanyloctadecylamine. | 1,3-bis(α-pentaoctadecyldisiloxanyloctadecyl)-urea. |

The novel ureas of this invention have utility as antifoam agents. As an illustration of this utility, 10 ml. of a liquid ionic detergent were shaken to produce a sizeable foam. To this foam was then added 0.2 ml. of an ethanolic solution of 1,3-bis(pentamethyldisiloxanylmethyl)urea. The foam was thereby substantially destroyed.

The ureas of this invention are represented by the foregoing Formula I in which $R_1$, $R_2$, $R_3$, $R_5$ and $R_6$ represent alkyl radicals and $R_4$ represents an alkylene radical. The alkyl and alkylene radicals can be unsubstituted or substituted with one or more substituent groups which include halogens, nitro, hydroxy, sulfate and aryl radicals. Preferred ureas are those in which the alkyl and alkylene radicals are unsubstituted and contain from 1 to 18 carbon atoms.

The process for the preparation of the ureas of this invention can be substantially varied. The reaction between carbonyl sulfide and the amine, as represented by Formula II, is preferably carried out at an elevated temperature. Temperatures in the range of from about 70° C. to about 150° C. are particularly useful. It is preferred that the reaction be carried out at superatmospheric pressures although atmospheric pressures can be used. The ratio of reactants can be substantially varied although best results are obtained when carbonyl sulfide is used in excess of the stoichiometric amount required. The reaction can be carried out in an inert solvent medium or in the absence of a solvent. After the reaction is complete, the urea can be recovered from the reaction mixture by any method well known to those skilled in the art.

The amines used in the process of this invention can be prepared by amination of the corresponding halogen compound in accordance with techniques well known to those skilled in the art.

What is claimed is:

1. As new compositions of matter, ureas represented by the formula:

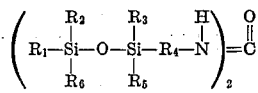

wherein $R_1$, $R_2$, $R_3$, $R_5$ and $R_6$ represent alkyl radicals and $R_4$ represents an alkylene radical.

2. Compositions as described in claim 1, wherein the radicals $R_1$, $R_2$, $R_3$, $R_4$, $R_5$ and $R_6$ are unsubstituted and contain from 1 to 18 carbon atoms.

3. 1,3-bis(pentamethyldisiloxanylmethyl)urea.

4. A process for preparing ureas having the formula:

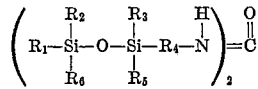

which comprises reacting by mixing at an elevated temperature, carbonyl sulfide and an amine having the formula:

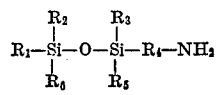

wherein $R_1$, $R_2$, $R_3$, $R_5$ and $R_6$ represent alkyl radicals and $R_4$ represents an alkylene radical.

5. A process as described in claim 4 wherein the amine is pentamethyldisiloxanylmethylamine.

6. A process as described in claim 4 wherein the amine is β-pentaethyldisiloxanylethylamine.

7. A process as described in claim 4 wherein the amine is pentapropyldisiloxanylmethylamine.

8. A process as described in claim 4, wherein the amine is β-penta-n-hexyldisiloxanylethylamine.

9. A process as described in claim 4 wherein the amine is penta-2-ethylhexyldisiloxanylmethylamine.

References Cited in the file of this patent

UNITED STATES PATENTS

| | | |
|---|---|---|
| 2,754,311 | Elliott | July 10, 1956 |
| 2,857,430 | Applegath et al. | Oct. 21, 1958 |

OTHER REFERENCES

Sommer et al.: "Jour. Am. Chem. Soc.," vol. 73 (November 1951), pp. 5130–4.

UNITED STATES PATENT OFFICE
CERTIFICATE OF CORRECTION

Patent No. 2,966,507                 December 27, 1960

Stewart R. Montgomery

It is hereby certified that error appears in the above numbered patent requiring correction and that the said Letters Patent should read as corrected below.

Column 2, Example V, under the heading "Ureas", lines 5, 6, and 7, should read as shown below instead of as in the patent:

1,3-bis{β-[1,1-dimethyl-3,3,3-(2-hydroxyethyl)-dimethyldisiloxanyl]-ethyl}urea.

Signed and sealed this 10th day of October 1961.

(SEAL)
Attest:

ERNEST W. SWIDER
Attesting Officer

DAVID L. LADD
Commissioner of Patents

USCOMM-DC